APPARATUS FOR WIRING PERSONALIZED CORE STORAGE ARRAYS

Filed May 8, 1968

INVENTOR
GERALD B. BARDO
BY John S. Gasper
ATTORNEY

United States Patent Office 3,529,341

Patented Sept. 22, 1970

3,529,341

APPARATUS FOR WIRING PERSONALIZED CORE STORAGE ARRAYS

Gerald B. Bardo, R.D. 1, Nichols, N.Y. 13812

Filed May 8, 1968, Ser. No. 727,481
Int. Cl. H05k *13/00*
U.S. Cl. 29—203 12 Claims

ABSTRACT OF THE DISCLOSURE

An apparatus for wiring apertured ferrite cores into personalized core storage matrices comprising a reference bar for holding cores at select co-ordinate positions of plural parallel wires pre-strung with movable cores and mounted on a frame to form a core mat. Pneumatic jets under control of a pneumatic punched tape reader control the supply of loose cores to the reference bar for winding with an orthogonal wire.

BACKGROUND OF THE INVENTION

Field of the invention

This invention relates to the wiring of apertured articles into co-ordinate groupings and more particularly to the wiring of ferrite cores into matrices in which the locations of the cores at the matrix co-ordinates is selectively variable.

Description of the prior art

Apertured ferrite elements commonly referred to as magnetic cores are used extensively as data storage elements in memories of computers. In some computer systems, a data storage device known as read only store (ROS) is used to store microprogrammed instructions. In the type of ROS to which this invention relates, magnetic cores are located at only certain predetermined matrix co-ordinate locations whereas other co-ordinate locations have no cores. In applications for computers having microprogram ROS devices, it is desired to substitute the ROS for various microprogram operations. It is a characteristic of the ROS matrix for each of the interchangeable microprograms that they be distinctive or "personalized." An apparatus for making such personalized ROS devices has not heretofore existed. Personalized magnetic core ROS devices made by manual techniques is very tedious and time consuming and leads to considerable rework due to human factor errors in the location of the cores at the particular matrix co-ordinate locations. This is particularly true since the cores utilized can be very small (e.g., having annular diameters of 7 x 12 mils).

SUMMARY OF THE INVENTION

It is an object of this invention to provide an apparatus for wiring co-ordinate groupings of apertured articles in which the location of the articles at predetermined co-ordinates of a matrix is selectively controllable.

It is an object of this invention to provide an apparatus for wiring a magnetic core matrix array having a selective co-ordinate distribution of magnetic cores for use as a read only storage device.

It is a further object of this invention to provide an apparatus capable of automatically wiring a personalized magnetic core matrix array.

The foregoing and other objects of this invention are realized in an apparatus which comprises pattern selection means operable for selectively operating on groups of cores prestrung on parallel co-ordinate wires of a core mat from which individual cores are selected from the selected groups for threading by a transverse co-ordinate when located by a referencing means. In the first embodiment, the pattern selection means comprises a personalizer bar operable under control of a pattern control unit for selectively inhibiting groups of cores from advancement to a referencing bar. The personalizer bar is equipped with orifices for at least some of the parallel wire positions and a pneumatic tape unit controls the generation of jets from the personalizer bar. The personalizer bar jets inhibit groups of cores on associated wires from being advanced by move-up means, preferably a pneumatic jet which operates to blow all cores to the reference bar. In alternate form, the invention uses the personalizer bar jets to recall all predetermined individual cores after separation from all groups that have been advanced to the reference bar. In a further form, the personalizer bar takes the form of a plate which coacts with a shroud device (preferably removable) to form individual channels for each of the groups of cores and the jets selectively advance groups of cores to the reference bar. The group selection means includes orifices for producing air jets within the individual channels under control of a pattern selection device such as a pneumatic tape unit.

It is also a feature of this invention to provide an improved construction for separating individual cores from the groups for wiring. In accordance with this feature, individual core selection uses air jets for separating the lead core of the group adjacent the reference bar. The air jet is applied vertically against the group of cores causing those in abutment to move along the wire away from the reference bar. The lead core, however, remains and is subsequently advanced to a co-ordinate location where wiring occurs. Improved separation of the lead core is obtained by providing an air deflection plate over the reference bar and extending away from the bar so that separation jets strike the bar and become laterally deflected to produce more quick and definite separation of the cores.

As a result of the above features of this invention, improved core wiring is obtained, particularly where a great variety of core patterns is desired. In addition, precision wiring required for cores of very small sizes used in magnetic memories, particularly of NDRO type, is readily attained. Errors in wiring are readily controlled and a mechanism has been provided which is capable of being automated.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 8 is a plan view of FIG. 7, and together show the initial condition when core selection is to proceed; FIG. 10 is a plan view of FIG. 9 showing core group selection using personalizer bar intercept techniques; FIG. 12 is a plan view of FIG. 11 showing the core selection from core groups advanced in FIGS. 9 and 10; FIG. 14 is a plan view of FIG. 13 showing the further core separation as reference bar moves away from core mat; FIG. 16 is a plan view of FIG. 15 showing position of selected cores held by the reference bar in preparation for threading a transverse wire; FIG. 17 is a plan view of FIG. 18 showing the transverse wire being threaded through selected cores and through coordinate positions where no core is present;

DESCRIPTION OF THE PREFERRED EMBODIMENTS

Figure 1:
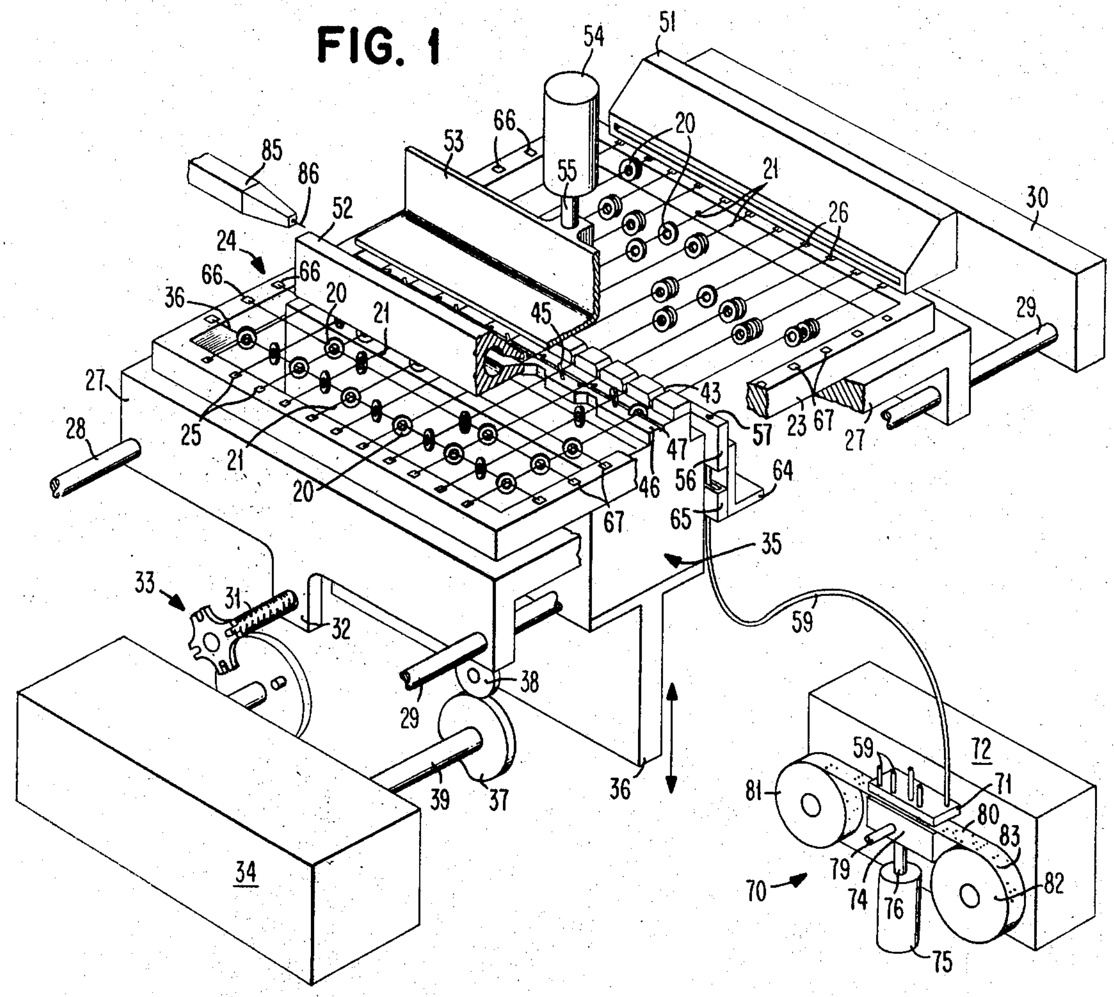
FIG. 1 is an isometric drawing of a first embodiment of a core wiring machine incorporating the features of this invention.

Prior to wiring the cores 20 into select matrix positions, cores 20 are strung on conductor wires 21 after which the wires are arranged in parallel on a frame 23 to form a core array matrix mat 24. Various ways for stringing cores 20 on the wires 21 may be used, but with cores of the size contemplated in using the present invention, the preferred technique is the one illustrated in U.S. patent application of H. K. Hazel and W. F. Mueller, Ser. No. 452,101, filed Apr. 30, 1965, now Pat. No. 3,460,245 and assigned to the same assignees as the present application. Briefly described, the method comprises placing a supply of randomly oriented cores 20 on the surface of a core block having plural semi-cylindrical recesses in the surface thereof arranged in one or more rows. The core block is vibrated to bring the cores proximate the recesses whereupon a vacuum connection to the recesses holds the cores in position. When all recesses are filled, a conductor wire 21 for each row is strung through the cores. The operation is repeated until the desired number of cores are strung onto the wires 21. The wires 21 with cores strung thereon are then attached to the rectangular frame 23 by welding the ends thereof to contact terminals 25 and 26. Additional information concerning the core stringing process may be obtained by referring to the above-mentioned copending application.

With the core-strung wires 21 mounted on the frame 23, the mat 24 is fixed in position on a horizontal annular platform 27 of apparatus of FIG. 1. The annular platform 27 is slidably mounted on horizontal fixed guide rods 28 and 29 supported at opposite ends to support blocks 30 which may conveniently be fixedly supported on a frame plate, not shown. A drive mechanism for moving annular platform 27 along the guide rods 28 and 29 comprises a worm gear 31 suitably journalled at its ends and threadably connected to platform 27 at extension 32. A drive means for moving the platform 27 incrementally along the guide rods comprises a Geneva gear mechanism 33 connected to a drive mechanism 34.

A horizontal core reference bar 35 which locates selected cores 20 for wiring with orthogonal conductor wires 36 at selected co-ordinate positions of mat 24 is located within the boundaries of the annular platform 27. The reference bar 35 is supported by vertical plate 36 below platform 27 in a manner whereby plate 36 is slidable to enable reference bar 35 to be moved into and out of contact with cores and wires 21 and 36. Vertical reciprocation is imparted to plate 36 by cam 37 and cam follower 38 of plate 36 by rotatable shaft 39 connected to drive mechanism 34. Preferably, the drive connection of cam 37 and Geneva gear 33 to drive mechanism 33 takes the form which permits each to operate separately and in synchronism when desired by suitable operator control means (not shown) of any well-known type.

Figure 4:
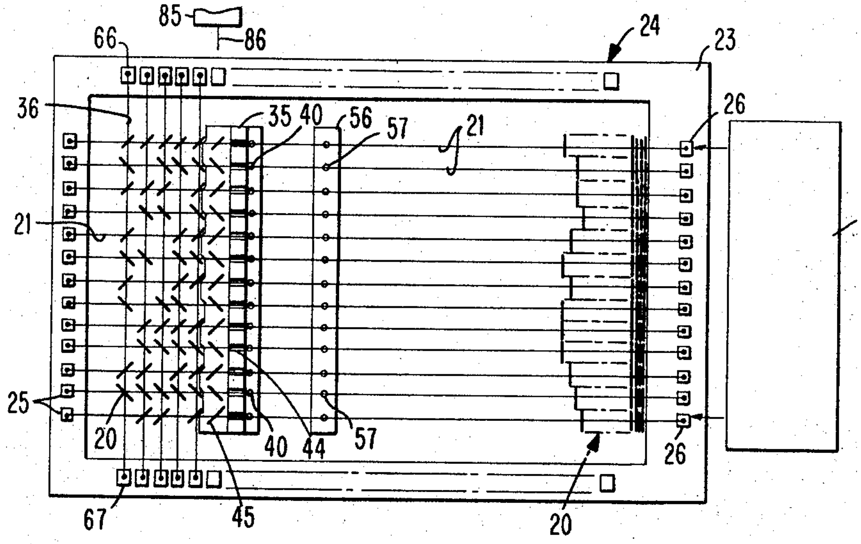
FIG. 4 is a plan view in schematic form showing a core mat in position for wiring by machine of FIG. 1.
Figure 5:
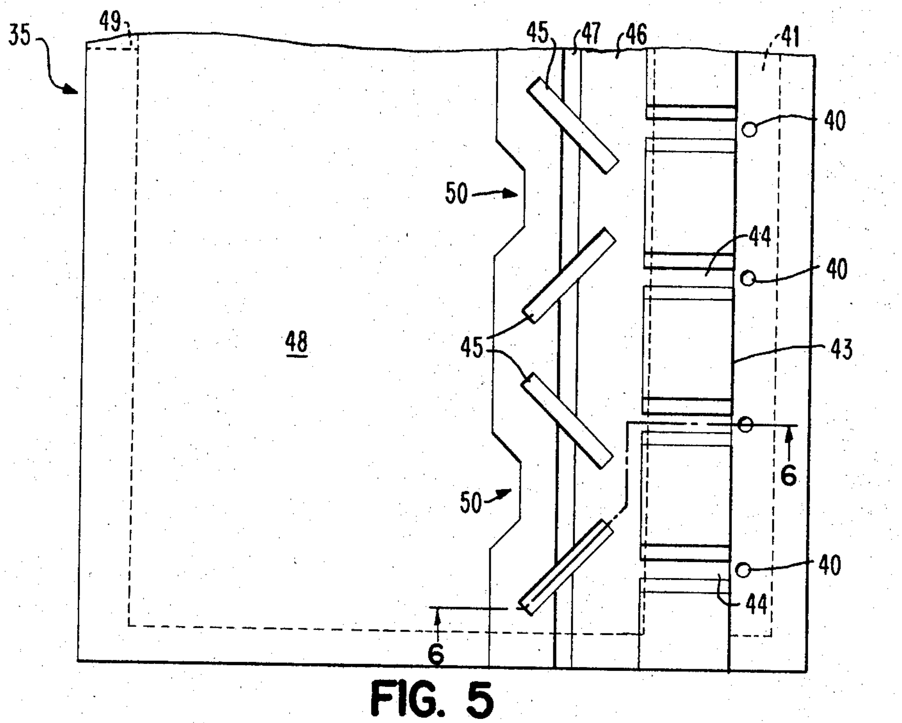
FIG. 5 is a plan view of a portion of the reference bar used in the machine of FIG. 1.
Figure 6:
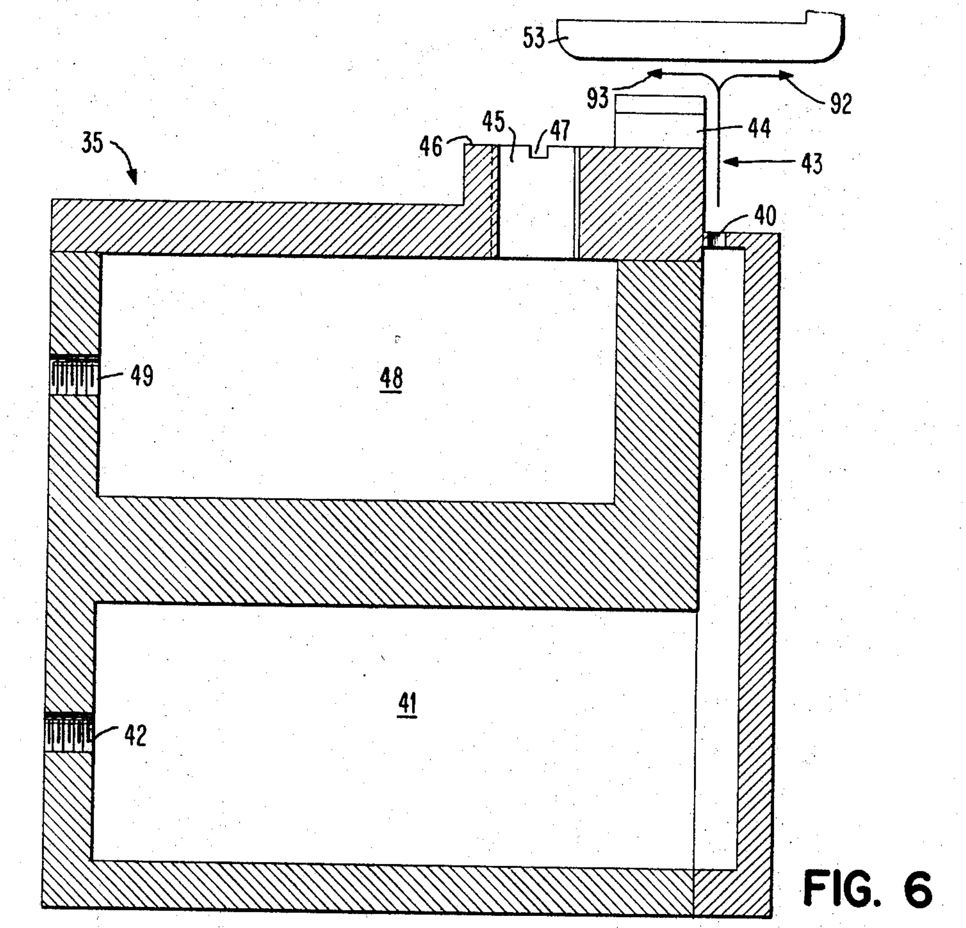
FIG. 6 is a cross-section of the reference bar with the air deflection plate taken along section line 6—6 of FIG. 5.
Figure 7:
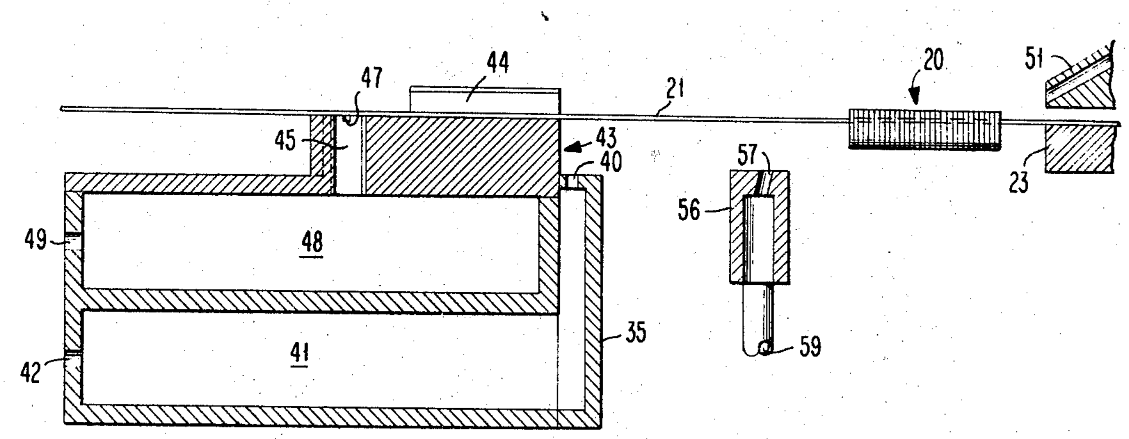
FIGS. 7 through 18 are schematized drawings illustrating the sequence of operations of the machine of FIG. 1. In these figures.
Figure 8:
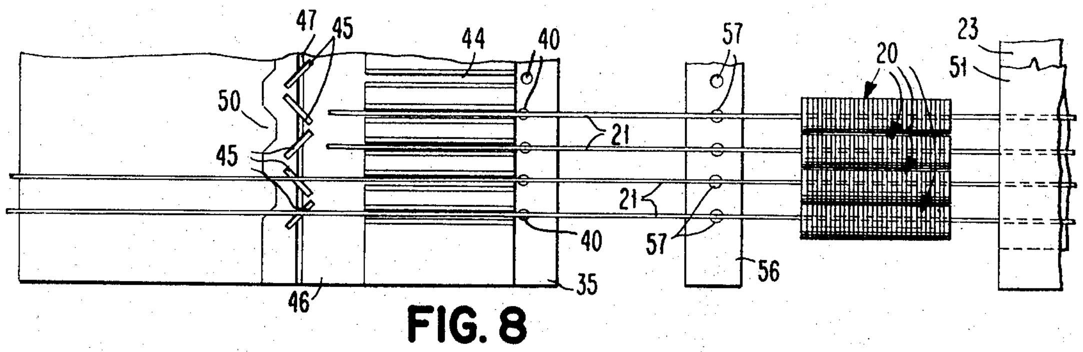
Figure 9:
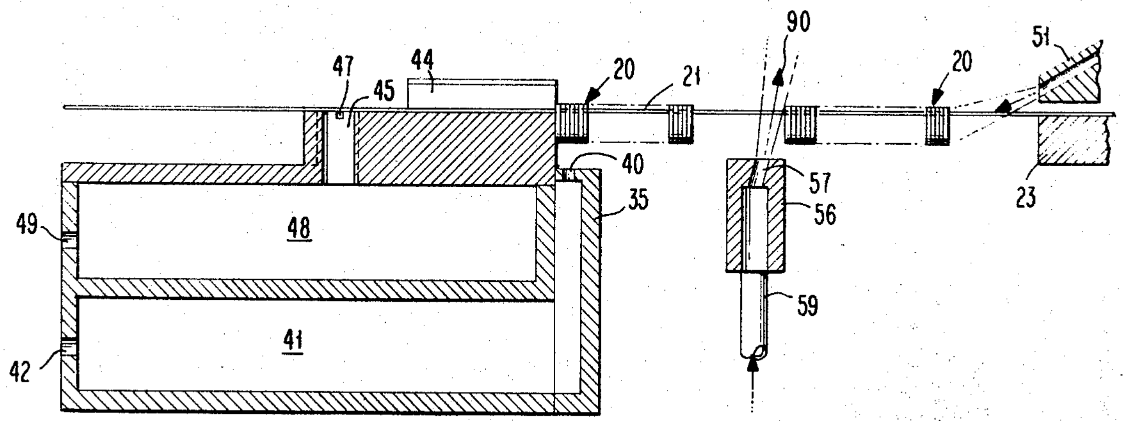
Figure 10:
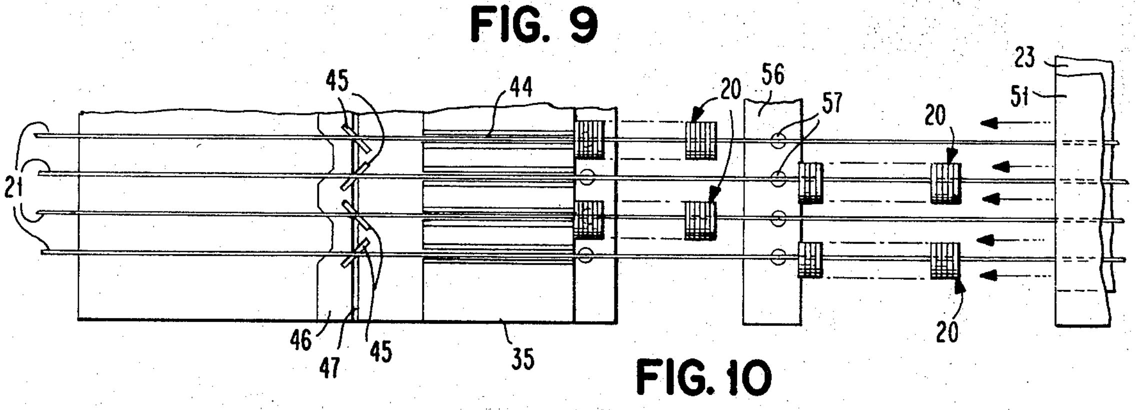
Figure 11:
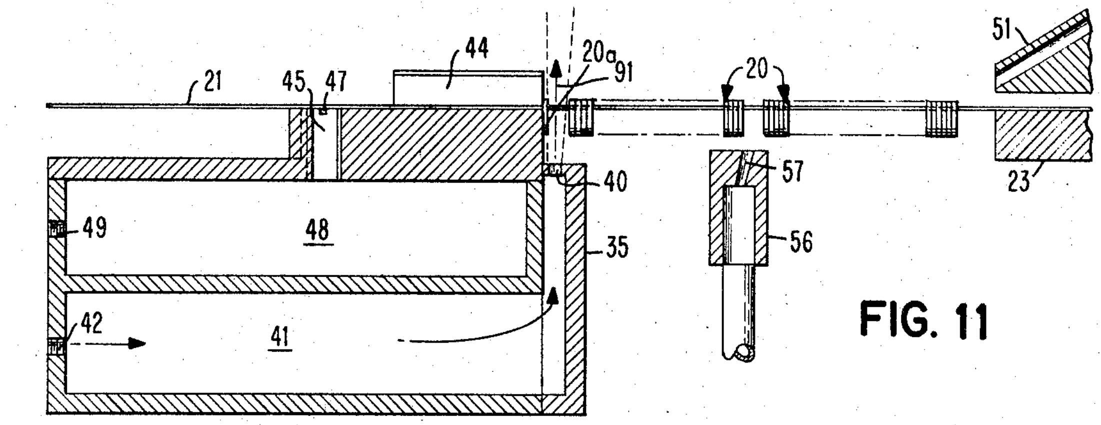
Figure 12:
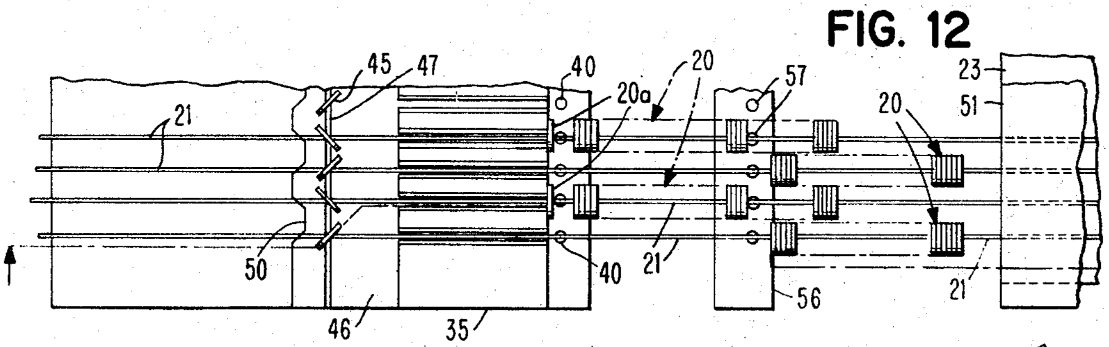
Figure 13:
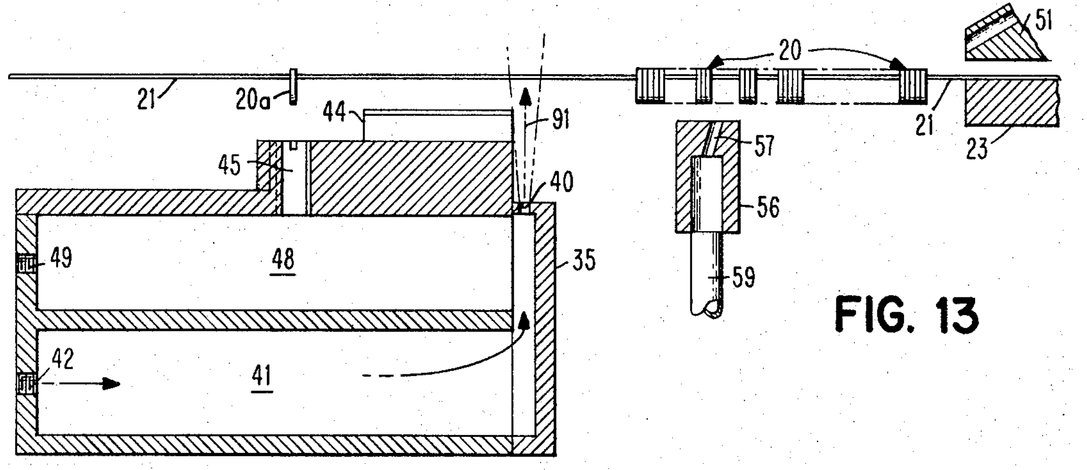
Figure 14:
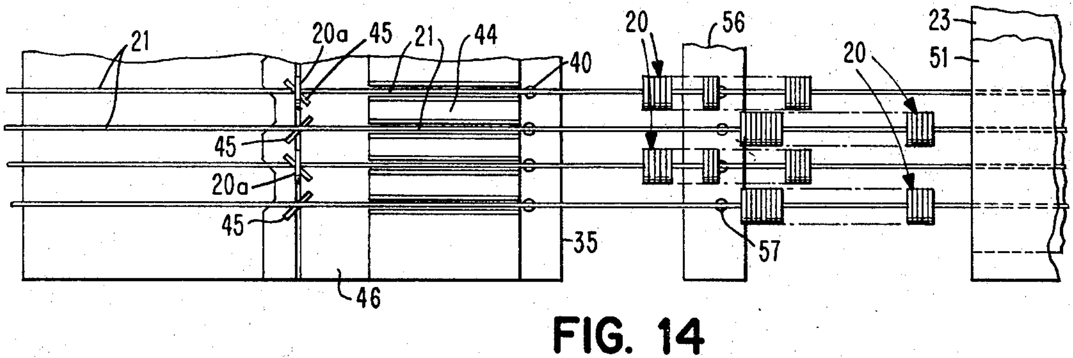
Figure 15:
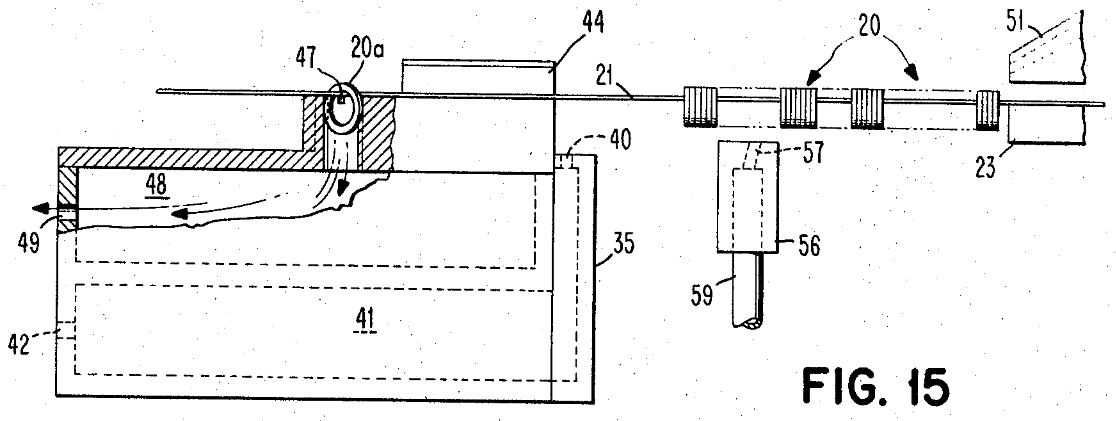
Figure 16:
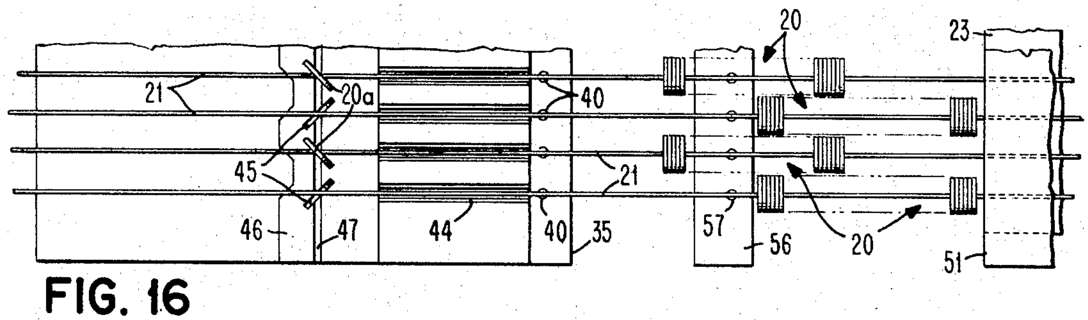

Referring to FIGS. 4, 5, and 6, the reference bar 35 has a plurality of separation jets 40 arranged in a row transverse to wires 21. The jets 40 are spaced so that they are directly below each wire 21. As seen in FIG. 6, the jets 40 are connected to a cavity 41 having an opening 42 connected to an air pressure source. When pressure is applied to cavity 41, air streaming from jet 40 passes upwardly toward wires 21 and any cores 20 positioned thereon above the right side of the reference bar 35. To the left of jets 40, the reference bar 35 has a raised wire guide portion 43 having guide grooves 44 for receiving the wire 21 when reference bar 35 is elevated by cam 37. To the left of wire guide 43 are a plurality of core recesses 45 in surface 46. The bottom of grooves 43 are co-planar with surface 46 of portion 43 of bar 36. A transverse groove 47 for receiving and guiding an orthogonal conductor wire 36 is formed in surface 46 on center with core recesses 45. The recesses 45 are alternately turned 45° from the line of wires 21 and a transverse groove 47 in surface 46. Recesses 45 lead to a second cavity 48 in reference bar 35 which has an opening 49 on the front surface for connection with a vacuum source. V-notches 50 are formed in left front edge of raised portion 43 to receive previously wired cores 21.

As best seen in FIG. 1, an air jet 51 is provided at the rear of the platform 27 above the core mat 24 for blowing loose cores 20 along wires 21 to line of contact with raised portion 43 of reference bar 35. A second air jet 52 may be located above the reference bar 35 for blowing any loose cores 20 to the rear of the mat 24 as more fully explained hereinafter. An L-shaped deflection plate 53 is located directly above the reference bar 35. Means for reciprocating the deflection plate 53 vertically to permit removal of mat 24 comprises an air cylinder 54, or the like, with piston rod 55 attached to the plate.

In computer systems utilizing core arrays made in accordance with this invention, the core mat 24 comprises conductor wires 21 and 36 threaded through various cores 20 located at selected co-ordinate matrix positions within the array, while other matrix positions have no cores. For a specific computer application, the core array thereby has a specific pattern of cores 20 within the mat 24, and from a logic point of view, may be considered to have "personality."

Figure 3:
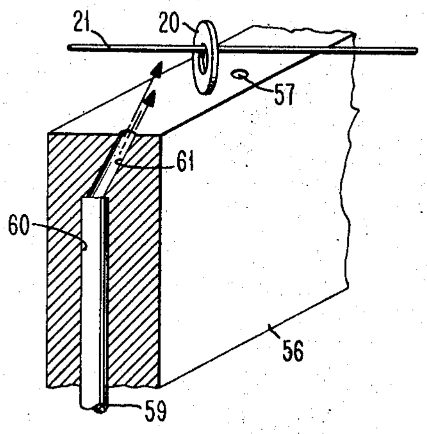
FIG. 3 is a portion of the pattern select bar showing air tube connections and the orifice construction.
Figure 2:
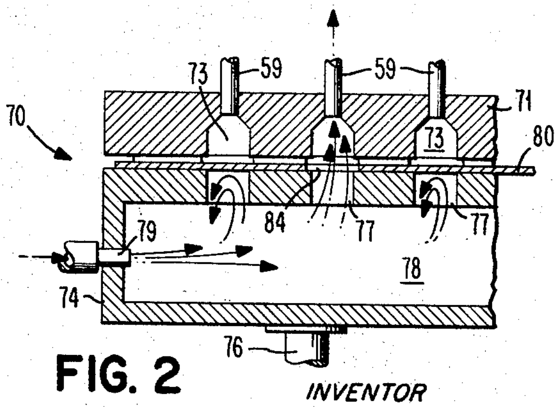
FIG. 2 is a cross-section showing the tape control unit used in the machine of FIG. 1.

The means for selecting, i.e. personalizing, the core pattern, in accordance with this invention, comprises a pattern or personalizer bar 56 provided with a plurality of jet orifices 57 individually connected through flexible air tubes 59 to a pneumatic tape read unit 70. In actual construction, for wiring very small cores 20, the base of the tubes 59 and orifices 57 are very fine approximating dimensions of a hypodermic device. As seen in FIG. 3, the jet orifices 57 of the pattern bar 56 have a wide portion 60 for receiving the upper end of the air tubes 59 and a narrower portion 61 angled from the vertical to direct air jets as indicated by arrow 62 rearwardly away from reference bar 35. As seen in FIG. 1, the pattern select bar 56 is held in position beneath platform 27 to the right of reference bar 35 by suitable means such as bracket 64 attached to a common support with block 30. A holding plate 65 is attached to bracket 64 to retain the air tubes 59 in linear position on the pattern bar 56. When in position, the pattern bar 56 is mounted so that a pattern select orifice 57 is beneath each wire 21.

The core pattern selection means further includes an input control device such as a pneumatic punched tape reader unit 70 designed to selectively produce various air jets from the orifices 57 of pattern bar 56. The tape read unit 70 comprises an upper read block 71 fixedly attached to the housing 72. A plurality of orifices 73 are formed in the upper read block 71 into which the lower ends of air tubes 59 are connected. The orifices 73 in the read block 71, which equal at least the number of jet orifices 57 in the pattern selection bar 56, are arranged in plural columns and rows to obtain greater reading density. A second or lower read block 74 is movably mounted on housing 72 directly below upper read block 71. A pneumatic drive cylinder 75 operating through piston rod 76 lowers and raises second block 74 when operated. Lower read block 74 has a set of orifices 77 arranged in two-dimensional array identical with the orifices 73 of the upper read block 71. A pressure chamber 78 in lower block 77 is connected to an air pressure source through opening 79. A punched tape 80 made of plastic, metal, or like rigid material is fed between the read blocks 71 and 74 from supply and takeup reels 81 and 82, respectively, by any well-known drive means, not shown, suitably located within housing 72. Core pattern selection is effected through the punched hole patterns 83 formed in the tape 80. Where a punched hole 84 exists in the tape 80, an open air channel exists from air pressure chamber 78 through aligned orifices 77 and 73 of read blocks 74 and 71 through air tubes 59 to the orifices 57 in pattern selector bar 56 at the predetermined wires 21 of mat 24. Where no hole is punched in tape 80, a closed air channel exists for the associated tubes 59 and orifices of bar 56. Thus, various core patterns for each row of the matrix of cores 20 on mat 24 are selected and correspond with the successive punched hole patterns 83 located on tape 80 and successively read by the tape read unit 70.

A wire feed unit 85 is located to one side of reference bar 35 so that wire 86 to form conductor wires 36 is in line with the transverse groove 47 of reference bar 35. The wire unit 85 may be of any known type and may be part of a sizing, stretching and welding unit of well known type.

The operation of the apparatus of FIG. 1 may be more clearly seen by referring to the sequence of FIG. 7 through 18, along with FIG. 1. After a supply of cores 20 have been threaded on wires 21 and fixed to the frame 23, the core mat 24 is placed on platform 27. Preferably, the drive motor 34 would first have been operated to move support platform 37 along guide bars 28 and 29 to the rearmost position and reference bar 36 will be in dropped position in which the cam follower 38 on plate 36 is in the low dwell of cam 37. With mat 24 located on platform 27, forward jet 52 is operated to blow back all cores 20 on the wires 21. The drive means 34 is then operated to advance platform 27 to align the first side contacts 66 and 67 with the transverse wire feed unit 85 and to raise the reference bar 35 to its uppermost position so that the wires 21 all rest within grooves 44 and on the surface 46 of the reference bar 35. At this time, or concurrently with the raising of the reference bar 35, lower block 74 of the tape read unit 70 being in lowered position, the tape 80 is advanced by drive of takeup reel 82 to bring the first punched hole pattern 83 into position beneath the orifices 73 of block 71. When tape 80 is positioned pneumatic cylinder 75 is operated raising lower block 74 into holding position. Air from source 78 is then turned on and where punched holes exist in the tape, air passes through various tubes 59 to pattern bar orifices 57 causing jets, as shown by arrow 90 (FIG. 9), to be directed against selected wires 21. Blow-up jet 51 is turned on causing loose cores 20 to begin to slide left along wires 21 toward the reference bar 35. Where air jets 90 have been turned on in orifices 57 of pattern bar 35, core groups 20 are intercepted and held from reaching the reference bar 35. Where no jets 90 were turned on, the blow-up jet 51 advances the core groups 20 so that the lead core 20*a* contacts the right edge of reference bar 35. In this position, the lead cores 20*a* rest on wires 21 above separation orifice 40 of the reference bar 35. Blow-up jet 51 is turned off while air pressure source connected to opening 42 is turned on supplying air to pressure chamber 41 of reference bar 35 causing air jets as shown by arrow 91 (see FIGS. 11 and 12) from orifices to be directed upwardly against cores 20 and wires 21, as the case may be. Initially, the separation jets 91 cause loose cores 20 behind the lead core 20*a* to move backward along the wires 21. With separation jets 91 still on, the reference bar 35 is then dropped due to rotation of cam 37 by drive 34 causing reference bar 35 to separate from the wires 21. The downward motion continues until the upper surface 46 of the reference bar 35 is below the lead core 20*a*. The downward motion of the reference bar causes the additional effect of the dispersing the separation jets 91 in the vicinity of wires 21. This causes the lead core 20*a* to advance further to the left and when the upper surface 46 of the reference bar 35 clears below cores 20*a*, they will be advanced to the left of the wire guide portions above the left side of the reference bar.

Figure 17:
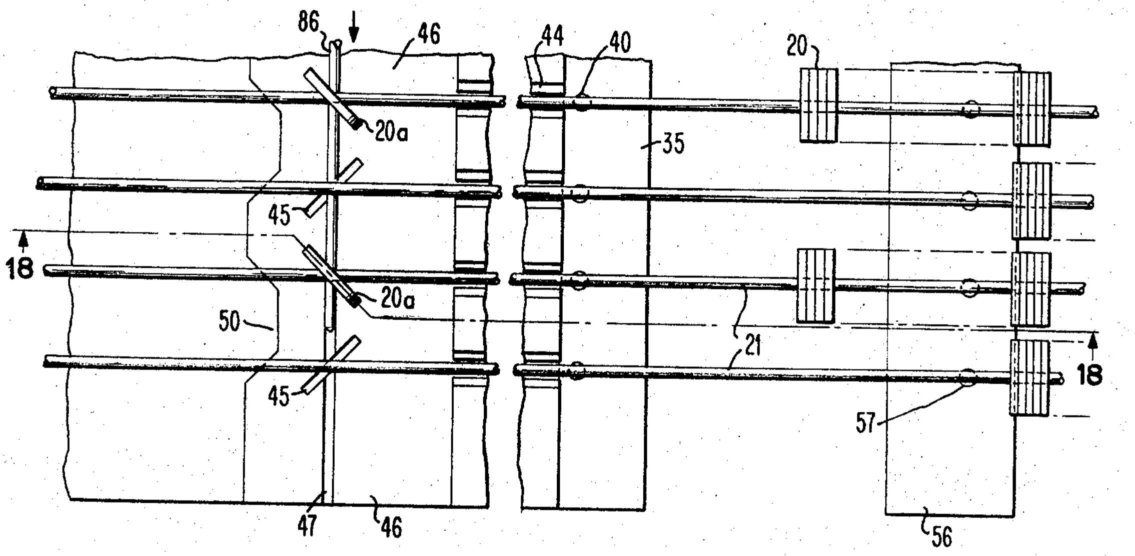
Figure 18:
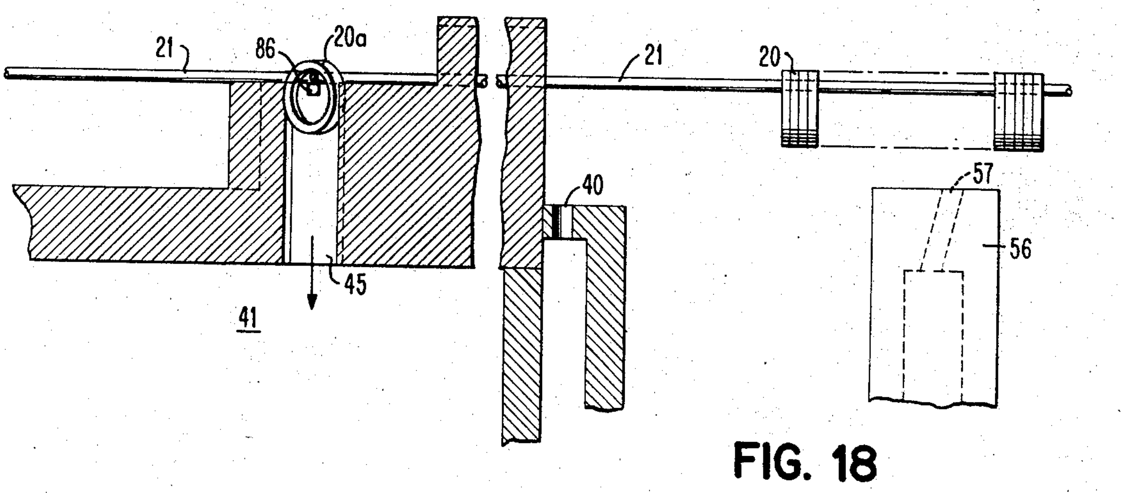
Figure 19:
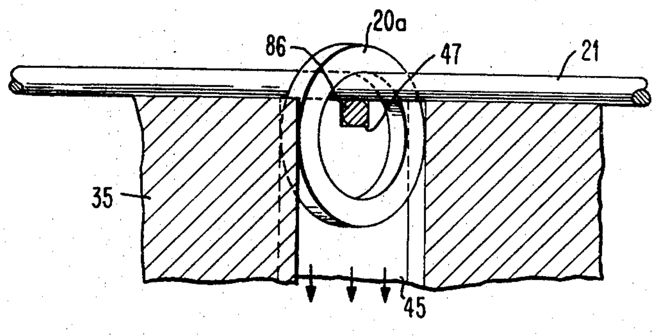
FIG. 19 is a section elevation of a fragment similar to FIG. 18, illustrating the structure whereby transverse wire threading occurs without contacting cores to be threaded.

In this position, the selected cores 20*a* are ready to be positioned for wiring with a conductor wire 86 from wire unit 85. Initially, the separation jets 91 from orifices 40 are turned off. The drive motor 34 rotates cam 37 to elevate the reference bar 35. At the same time, the vacuum source connected through opening 49 of reference bar 35 is activated creating a vacuum in chamber 48 applying suction pressure through core recesses 45. This vacuum pressure causes the selected cores 20*a* to move to a position above and in line with the recesses 45. As the bar 35 moves upward to its uppermost position where its follower 38 rests on the high of cam 39, the wires 21 again come to rest in the wire guides 44 and on the upper surface 46 (see FIGS. 15 and 16). Because of vacuum in chamber 48 of reference bar 35, cores 20*a* are pulled downwardly within the recesses 45. In this position, the cores 20*a* are suspended solely from the wires 21. In this position also, as best seen in FIGS. 17, 18, and 19, the wires 21 and the groove 47 in surface 46 of reference bar 35 form virtually a closed path for the orthogonal wire 86 fed from unit 85. In passing through the groove 47, wire 86 is held in position by wires 21 at those positions where no core 20*a* occupies a recess 45. In those positions where a core 20*a* is being held, wire 86 passes through the opening of core 20*a* without contacting any portion of the core thereby avoiding abrasive or gouging effects which might affect the magnetic properties of the cores and not cause any problem in feeding the wire, such as bending or scraping insulation. After threading is completed, the wire 86 from unit 85 is sized, welded to contacts 66 and 67, and drawn to provide a hardened lead point as more fully described in U.S. Pat. 3,314,131 of R. L. Judge, issued Apr. 18, 1967, and assigned to the same assignee as this invention. Testing of cores may also be performed as part of the wiring and prior to welding step, if desired, in a well-known manner.

In the above sequence, the separation of loose cores 20 by jets 91 from reference bars 35 were shown to occur without use of deflection plate 53 (see FIG. 6). Additional advantage producing a more effective separation of the lead core 20*a* from the other loose cores 20 advanced by the blow-up jet 51 can be realized by using deflection plate 53. This plate 53 is located just above the reference bar 35 so that a slight separation exists, as shown in FIG. 6, to permit air flow (as shown by arrows 92 and 93) from jets to move left and right around plate 53. By deflecting the air flow laterally, deflection plate 53 increases the flow of air along the wires 21 causing cores 20 and 20*a* to separate more quickly and more pronouncedly. The deflection plate 53 may be slightly contoured at its ends to increase ease of air flow along the wires 21. While deflection plate 53 is shown in this example being used for a personalized storage application, it would be applicable for other memory array device manufacture.

Figure 20:
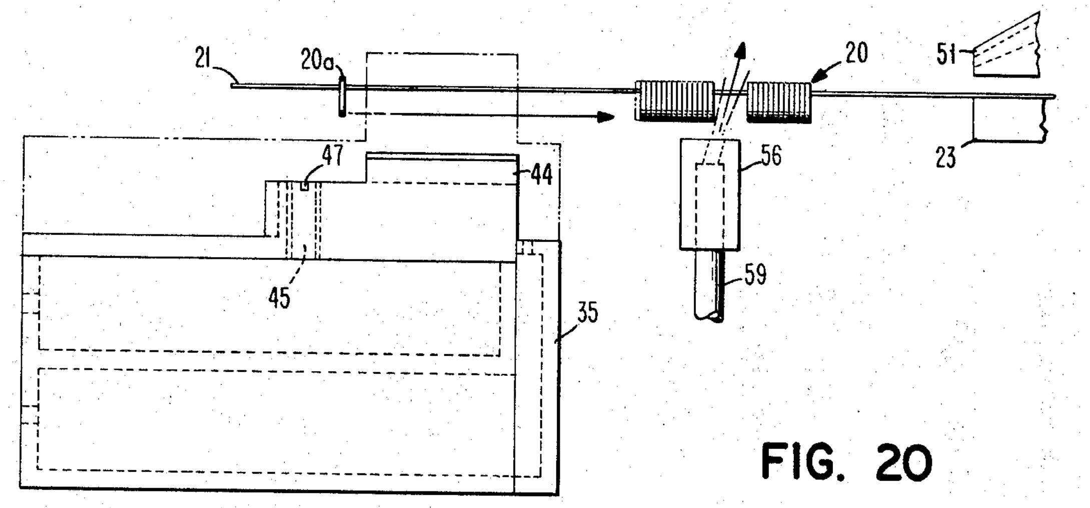
FIG. 20 is an alternate step following the operation depicted in FIG. 13 in which cores are recalled from the threading position.

In the preferred embodiment just described, the pattern selection utilizes air jets 91 to intercept cores 20 on wires 21 where no core is called for. In an alternate technique, the blow-up jet 51 is operated to blow core groups 20 on all wires 21 to a position adjacent reference bar 35. A lead core 20*a* is selected by separation jets 91 from orifices 40 on all wires 21 as the reference bar 35 is dropped by rotating cam 37. The separation jets 91 are then turned off. The loose cores moved rearwardly will occupy a position over the pattern bar orifices 57, as shown in FIG. 20. It has been discovered that if the pattern jets 90 are now turned on at those wire positions where no core is to be wired, the lead cores 20*a* (with reference bar 35 retained in down position) will move to the rearward position along with other loose cores 20. The exact reason why this happens has not been fully determined; however, it is believed that a combination of vibration of wires 21 plus turbulence in the position of the pattern jets 90 causes a pressure differential causing the lead cores 20*a* to move rearwardly toward the pattern jets 91. When the recalled cores 20 have been advanced to the rear side of the reference bar 35, it is raised into position with the vacuum applied to the recesses 45 and the selected cores 20*a* captured and wired, as previously described.

Figure 21:
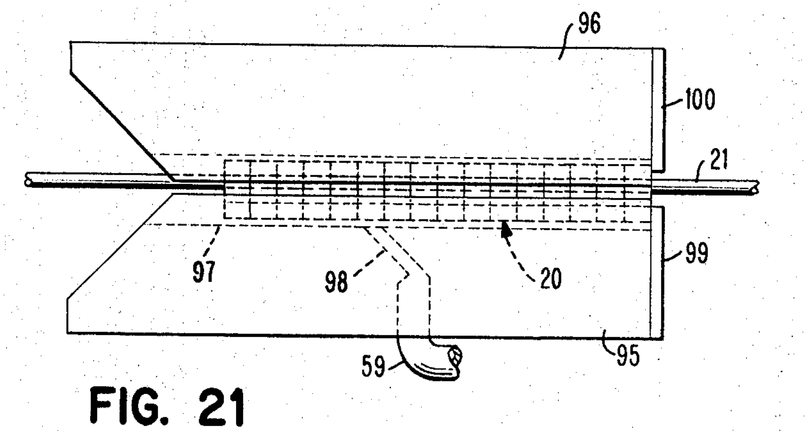
FIGS. 21 and 22 illustrate a third embodiment for selective pattern core selection.
Figure 22:
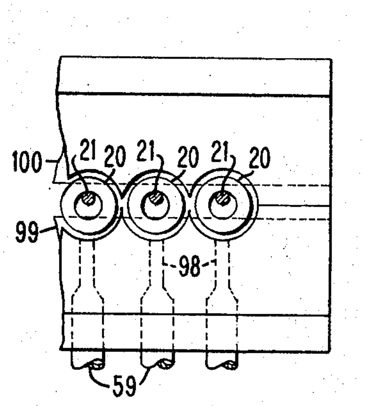

A third embodiment for selective pattern core selection is shown in FIGS. 21 and 22 and comprises combining a pattern bar 95 and a shroud 96 constructed to form plural parallel channels 97 through which the wires 21 pass. The loose cores 20 suspended on wires 21 are contained within the channels 97. With this construction, the loose cores 20 on the wires 21 are maintained physically separated from adjacent cores. This construction is particularly suitable where the matrix pattern is desired wires 21 where no core is called for. In an alternate as shown in FIG. 20. It has been discovered that if the with very close spacings and physical contact between cores 20 on adjacent wires 21 must be prevented to avoid erroneous pattern selection. Pattern selection air jet orifices 98 are formed within the bottom of the channel 97 of the pattern bar 95 in the same manner as bar of FIG. 1 with tube connections 59 to a pneumatic punched tape read unit 70. In this case, however, the jet orifices 98 are angled in forward direction, i.e., toward the reference bar since, in this embodiment, pattern selection is made by selectively blowing cores 20 forward rather than intercepting or recalling cores. Thus, in preselected channels, determined by the tape unit 70, certain jets are formed to advance cores 20 on the selected wires 21 to line of contact with the reference bar 35. The separation of the lead core and wiring proceed in the manner previously described. In one form, the shroud 96 and the pattern bar 95 may be provided with back plates 99 and 100 to prevent loose cores 20 from moving behind the shroud when blowback jet 52 is operated.

While the invention has ben particularly shown and described with reference to preferred embodiments thereof, it will be understood by those skilled in the art that various changes in form and details may be made therein without departing from the spirit and scope of the invention.

What is claimed is:

1. Apparatus for making a personalized memory array from a mat comprising a plurality of first co-ordinate parallel length of wires and a group of apertured cores loosely strung on said wires;

means for referencing selected individual cores selected from said groups of cores at predetermined co-ordinate positions of said mat;

means for selecting groups of said cores from which individual cores will be selected for wiring at said co-ordinate positions; and means for transversely threading second co-ordinate wires through selected individual cores referenced by said referencing means.

2. Apparatus in accordance with claim 1 in which said group selection means comprises a pneumatic jet means for selectively moving said groups of cores from a first position to a position adjacent said referencing means.

3. Apparatus in accordance with claim 2 in which said group selection means comprises pneumatic jet means for moving all of said groups of cores along said first co-ordinate wires in a direction toward said referencing means; and means for selectively intercepting certain groups of said cores where it is desired to have no cores at predetermined co-ordinate positions.

4. Apparatus in accordance with claim 3 in which said intercepting means comprises pneumatic jet means operable in accordance with a predetermined pattern of cores to be wired.

5. Apparatus in accordance with claim 4 in which said intercepting means comprises a personalized bar located adjacent said first co-ordinate wires intermediate said referencing means and said groups of cores on said first co-ordinated wires;

said peronalizer bar having orifice means for directing air jets in the path of motion of said groups of cores; and pattern control means for selectively producing air jets from said orifice means whereby a jet stream is produced in opposition the motion of certain groups of cores along said first co-ordinate wires.

6. Apparatus in accordance with claim 5 in which said pattern control means comprises a pneumatic tape device including tape means having discrete pattern indicia for selectively producing said air jets.

7. Apparatus in accordance with claim 6 in which said pattern control means comprises an air pressure source including a block member with an air pressure chamber;

said chamber having a plural orifice means arranged in a predetermined array for connecting said air pressure source to said orifices of said intercept bar; and said tape means has punched hole indicia indicative of core patterns to be wired; and means for positioning said tape in position to selectively open and close said orifices of said pressure unit whereby air jets from said personalizer bar selectively intercepts said groups of cores.

8. Apparatus in accordance with claim 2 in which said pneumatic jet means comprises a pair of plate members located on opposite sides of said mat proximate said groups of loose cores, said plate members having a channel means for providing lateral separation between said groups of loose cores; and means for selectively advancing individual groups of cores along said wires toward said referencing means including orifice means associated with each said channel means; and means for selectively producing air jets from said channel orifices in accordance with a predetermined core wiring pattern.

9. An apparatus in accordance with claim 1 in which said group selection means comprises pneumatic means for advancing all groups of cores along said first wire into contact with said referencing means;

means associated with said referencing means for separating an individual core from all of said groups and advancing said selected cores to a transverse co-ordinate position for threading with a transversing wire;

means for selectively recalling selected ones of said individual cores from said co-ordinate wiring position prior to threading said cores with said transverse wire.

10. Apparatus in accordance with claim 9 in which said recall means includes means for directing air jets against selected wires having individual cores desired to be removed from the co-ordinate wiring position prior to threading by said transverse wire.

11. Apparatus for making a memory array from a mat comprising a plurality of first co-ordinate parallel lengths of wires and groups of apertured cores loosely strung on said wire;

reference bar means for locating individual ones of said cores at row positions of said array for threading by a second co-ordinate wire;

means for advancing said groups of cores into position adjacent said reference bar;

air jet means associated with said reference bar for separating selected individual cores from said groups of cores in the vicinity of said reference bar; and air deflection means located proximate said air jet means for forming an air stream in opposite direction along said wire whereby said individually selected cores and said unselected cores of said groups are moved in opposite directions along said wires.

12. An apparatus in accordance with claim 11 in which said reference bar is transverse to said co-ordinate wires and said air jet means comprises jet orifices located in said reference bar on one side of said wires;

said orifice directing air jets transversely at said cores located on said wires proximate said reference bar; and said deflection means comprises a plate member having an air directing surface substantially parallel with said wires and transverse to jets from said orifices.

References Cited

UNITED STATES PATENTS

| | | | |
|---|---|---|---|
| 2,958,126 | 11/1960 | Shaw et al. | 29—604 |
| 3,129,494 | 4/1964 | Perkins | 29—433 X |
| 3,156,969 | 11/1964 | Shaw | 29—203 X |
| 3,314,131 | 4/1967 | Judge | 29—241 X |

THOMAS H. EAGER, Primary Examiner

U.S. Cl. X.R.

29—241

PO-1050
(5/69)

UNITED STATES PATENT OFFICE
CERTIFICATE OF CORRECTION

Patent No. 3,529,341 Dated September 22, 1970

Inventor(s) Gerald B. Bardo

It is certified that error appears in the above-identified patent and that said Letters Patent are hereby corrected as shown below:

Column 1, line 4, following "13812" insert --, assignor to International Business Machines Corporation, Armonk, New York, a corporation of New York--.

Signed and sealed this 15th day of August 1972.

(SEAL)
Attest:

EDWARD M. FLETCHER, JR.
Attesting Officer

ROBERT GOTTSCHALK
Commissioner of Patents